United States Patent [19]
Fujita et al.

[11] Patent Number: 5,445,579
[45] Date of Patent: Aug. 29, 1995

[54] SPEED CHANGE CONTROL APPARATUS AND METHOD FOR AN AUTOMATIC TRANSMISSION IN A VEHICLE

[75] Inventors: Kenjiro Fujita, Kusatsu; Katsutoshi Usuki, Kyoto, both of Japan

[73] Assignee: Mitsubishi Jidosha Kogyo Kabushiki Kaisha, Tokyo, Japan

[21] Appl. No.: 105,171

[22] Filed: Aug. 12, 1993

[30] Foreign Application Priority Data

Aug. 14, 1992 [JP] Japan .................................. 4-216962

[51] Int. Cl.⁶ ............................................ B60K 41/02
[52] U.S. Cl. ................................ 477/156; 477/132; 477/155; 477/161; 477/164
[58] Field of Search .................... 477/53, 61, 131, 132, 477/155, 154, 139, 143, 144, 156, 158, 159, 160, 161, 164

[56] References Cited

U.S. PATENT DOCUMENTS

| | | |
|---|---|---|
| 4,838,126 | 6/1989 | Wilfinger et al. . |
| 4,922,424 | 5/1990 | Hiramatsu .................... 477/155 X |
| 5,029,492 | 7/1991 | Kiuchi ........................ 477/143 X |
| 5,079,705 | 1/1992 | Sakai et al. .................. 477/143 X |
| 5,103,694 | 4/1992 | Kobayashi et al. . |
| 5,133,230 | 7/1992 | Ito et al. . |

FOREIGN PATENT DOCUMENTS

| | | |
|---|---|---|
| 0414901 | 3/1991 | European Pat. Off. . |
| 0475585 | 3/1992 | European Pat. Off. . |
| 0481393 | 4/1992 | European Pat. Off. . |
| 0482690 | 4/1992 | European Pat. Off. . |

*Primary Examiner*—Charles A. Marmor
*Assistant Examiner*—Peter Kwon

[57] ABSTRACT

A speed change control method and apparatus for a vehicular automatic transmission having a first-speed clutch for establishing a first speed and a second-speed clutch for establishing a second speed, includes subjection of at least a duty ratio Dr of a second-speed solenoid valve for supplying oil pressure to the second-speed clutch to feedback control, so that the first-speed clutch is engaged while disengaging the second-speed clutch. This thereby increases a turbine rotational speed Nt toward the first-speed synchronous rotational speed. Further, an upper limit value Dmax of the duty ratio Dr is set, and the duty ratio Dr is subject to feedback control within a resultant duty ratio range. This thereby prevents the duty ratio Dr from being set at an excessive value caused by a delay in the rise of the oil pressure. As a result, even if a depression of an accelerator pedal is suddenly increased during a downshifting process, an interlock problem can be prevented, thereby ensuring smooth speed change.

10 Claims, 8 Drawing Sheets

F I G. 8
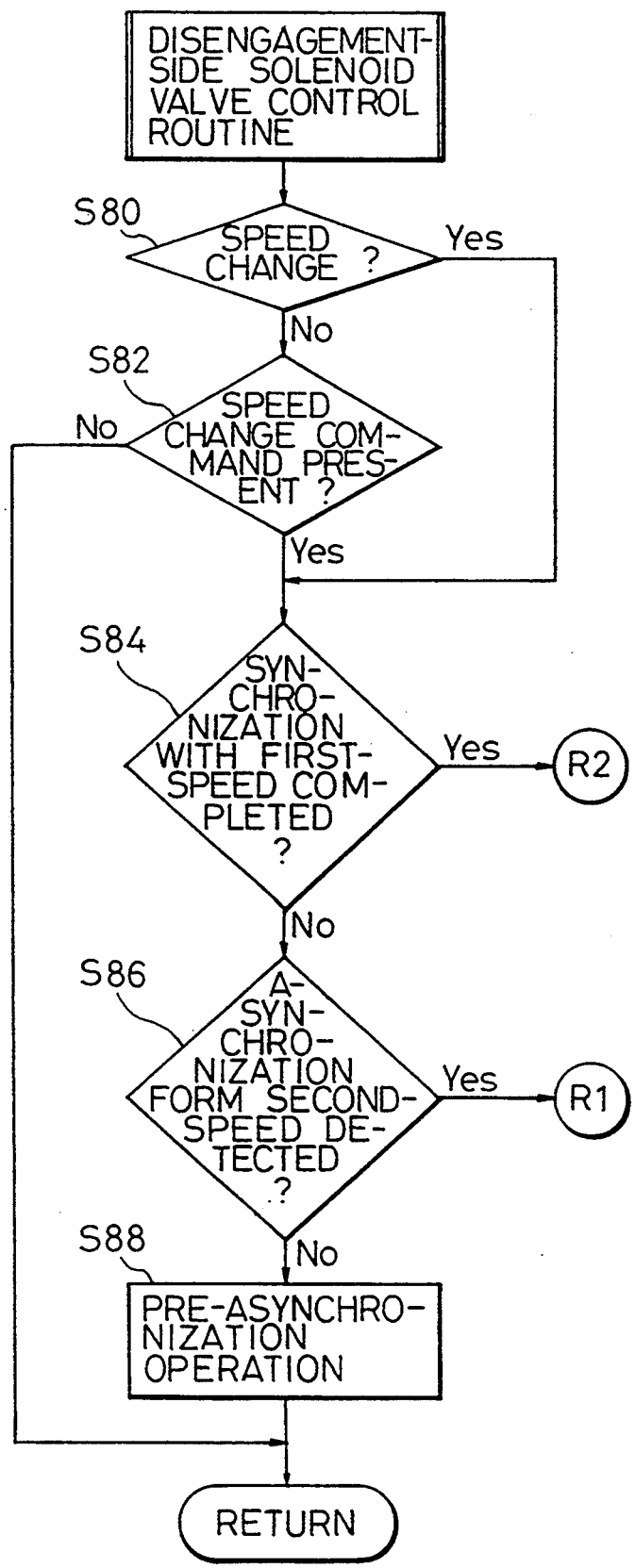

SPEED CHANGE CONTROL APPARATUS AND METHOD FOR AN AUTOMATIC TRANSMISSION IN A VEHICLE

BACKGROUND OF THE INVENTION

The present invention relates to a speed change control apparatus and method for an automatic transmission in a vehicle. More particularly, it relates to a speed change control apparatus and method for downshifting.

In a conventional speed change control method for an automatic transmission in a vehicle, to carry out a downshift from the second speed to the first speed, for example, a controller performs feedback control separately on the solenoid valves. The solenoid valves supply oil pressure to the first-speed clutch and the second speed clutch, respectively, so as to increase the rotational speed of a transmission input shaft to the first-speed synchronous rotational speed. The changing rate of the input shaft speed is kept coincident with target values on the engagement- and disengagement-side clutches. This thereby engages the first-speed clutch with a specified timing while disengaging the second-speed clutch, so that the downshifting operation is completed.

According to this method, it is possible to implement a downshift irrespective of the driving condition (so-called power on or off state) of an engine.

The aforementioned conventional speed change control method, however, presents the following problem.

A case is considered in which the opening of a throttle valve suddenly increases during downshifting as shown by a curve "a" in FIG. 13. The sudden increase in the opening of the throttle valve leads to a sudden increase in the rotational speed of the transmission input shaft, as shown in FIG. 13 by the two-dot chain line curve "b" indicative of the time-dependent change of a turbine rotational speed Nt. In this case, the controller tries to suppress the sudden increase in the rotational speed of the input shaft by increasing the duty ratio of the second-speed solenoid valve, so that the oil pressure of the second-speed clutch can increase to match the changing rate of the input shaft rotational speed to the changing rate of the disengagement-side target value.

The hydraulic circuit system located between the second-speed clutch and the solenoid valve, however, has components such as an accumulator and orifice because of its structural necessity. Therefore, even when the duty ratio of the solenoid valve is increased, the oil pressure of the second-speed clutch does not immediately increase. This causes the controller to misjudge that the oil pressure of the second-speed clutch is still too low and therefore to further increase the duty ratio of the solenoid valve. As a result, the controller increases the working oil pressure of the second-speed clutch higher than necessary (This is shown in FIG. 13 by a two-dot chain line curve d3 indicative of the changes in the duty ratio of the solenoid valve with the elapse of time).

Thus, the oil pressure supplied to the second-speed clutch becomes higher than necessary, and hence the disengagement of the clutch is delayed. This results in "interlock" in relation to the first-speed clutch which is gradually being engaged. As a result, the torque of the output shaft significantly changes as shown in FIG. 13 by the two-dot chain line curve "c" indicative of the changes in the T/M output shaft torque with the elapse of time, presenting a problem of the occurrence of a significant speed change shock.

OBJECT AND SUMMARY OF THE INVENTION

An object of the present invention is to provide a speed change control apparatus and method for an automatic transmission in a vehicle which permit smooth speed change by preventing the occurrence of the interlock problem when the depression of the accelerator pedal suddenly increases during a downshifting process.

This and other objects of the present invention are fulfilled by providing, according to one aspect of the present invention, a speed change control apparatus for an automatic transmission in a vehicle. The automatic transmission has a first friction-engaging means for establishing a first gear position, a second friction-engaging means for establishing a second gear position, a first oil pressure control means for controlling an oil pressure applied to the first friction-engaging means, and a second oil pressure control means for controlling an oil pressure applied to the second friction-engaging means. The speed change control apparatus performs duty control of at least the first oil pressure control means, so as to effect a shift from the first gear position to the second gear position by disengaging the first friction-engaging means, which has been in an engaged state, and by engaging the second friction-engaging means which has been in a disengaged state.

The speed change control apparatus comprises a duty ratio determining means for determining a duty ratio for the duty control of at least the first oil pressure control means, a limit value determining means for setting a limit value for the determined duty ratio, and a driving means for driving at least the first oil pressure control means according to a limited duty ratio which is determined from the duty ratio and the limit value.

Preferably, the speed change control apparatus further includes a feedback control means for feedback-controlling at least the first oil pressure control means using, as a target value, a turbine rotational speed change rate of a hydraulic coupling coupled to an input shaft of the automatic transmission. The duty ratio determining means determines the duty ratio in accordance with a difference between the target value and an actual value.

Preferably, the limit value determining means sets the limit value in accordance with an engine load of the vehicle or an input shaft torque of the automatic transmission. More preferably, the input shaft torque is determined in accordance with a speed ratio of the hydraulic coupling coupled to the input shaft of the automatic transmission.

According to another aspect of the present invention, a speed change control method for an automatic transmission in a vehicle is provided. The automatic transmission has a first oil pressure control means for controlling an oil pressure applied to a first friction-engaging means for establishing a first gear position, and a second oil pressure control means for controlling an oil pressure applied to a second friction-engaging means for establishing a second gear position. In this speed change control method, at least the first oil pressure control means is subject to duty control. Thus, the first friction-engaging means which has been in an engaged state is released, and the second friction-engaging means which has been disengaged is engaged, to thereby effect a shift from the first gear position to the second gear position.

The speed change control method comprises the steps of determining the duty ratio for the duty control of at least the first oil pressure control means, setting the limit value for the determined duty ratio, determining a limited duty ratio according to the duty ratio and the limit value, and driving at least the first oil pressure control means according to the limited duty ratio.

Preferably, the speed change control method further comprises a feedback control step of feedback-controlling at least the first oil pressure control means using, as a target value, a change rate of a turbine rotational speed a hydraulic coupling coupled to an input shaft of the automatic transmission. The duty ratio is determined in accordance with a difference between the target value and an actual value.

Preferably, the limit value is set in accordance with an engine load of the vehicle or an input shaft torque of the automatic transmission. More preferably, the input shaft torque is determined by a speed ratio of the hydraulic coupling coupled to the input shaft of the automatic transmission.

The speed change control apparatus and method according to the present invention are advantageous in that they prevent the oil pressure from being set for an excessive value resulting from a delayed rise of the oil pressure in a hydraulic circuit of an automatic transmission. This makes it possible to ensure smooth downshifting by preventing the interlock problem from occurring even if the depression of an accelerator pedal suddenly increases during a downshifting process, thereby suppressing a speed change shock.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent from an understanding of the preferred embodiments described below with reference to the following drawing figures.

BRIEF DESCRIPTION OF THE DRAWINGS

FIG. 8 is a flowchart showing part of the disengaging clutch control routine which is implemented by the controller;

DETAILED DESCRIPTION

Figure 1:
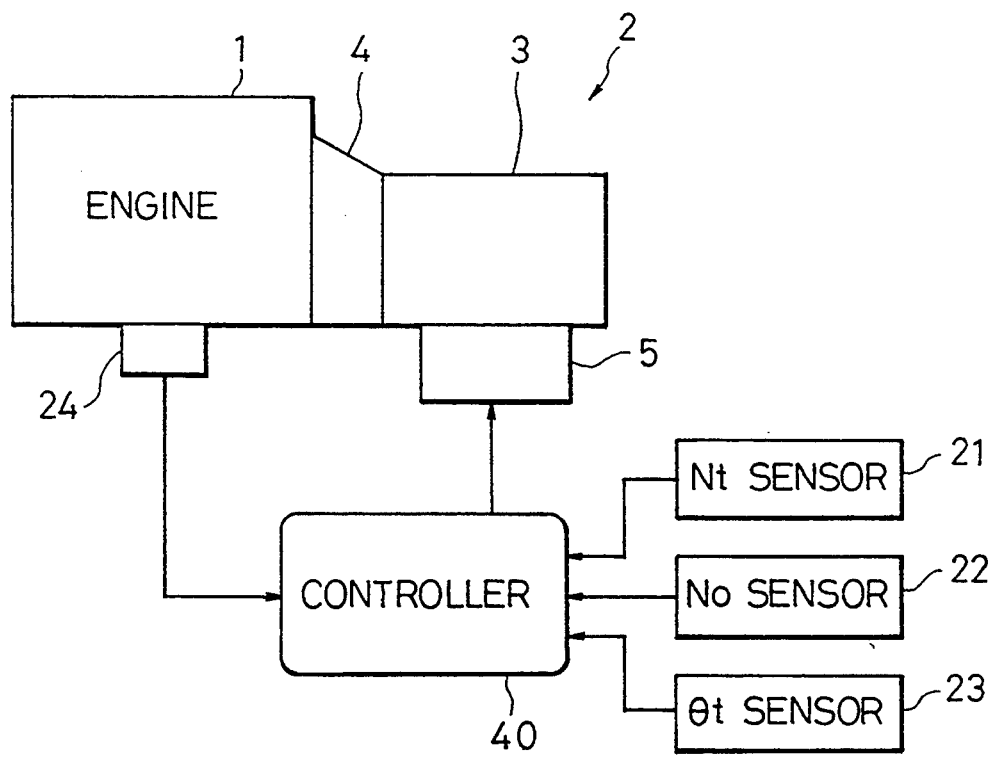
FIG. 1 is a schematic configuration diagram of an automatic transmission for a vehicle equipped with a speed change control apparatus according to the present invention.

In the following, an embodiment of the present invention will be explained in detail with reference to the attached drawings In FIG. 1, reference numeral 1 denotes an internal-combustion engine whose output is transmitted to driving wheels (not shown) via an automatic transmission 2. The automatic transmission 2 mainly consists of a torque converter 4, a gear transmission 3, a hydraulic circuit 5, and a controller 40. The gear transmission 3 is provided with, for example, a four-speed gear train, and many speed change friction-engaging devices for switching the gear ratio of the gear train, to thereby effect a speed change operation. The speed change friction-engaging devices are, for instance, hydraulic clutches and hydraulic brakes.

Figure 2:
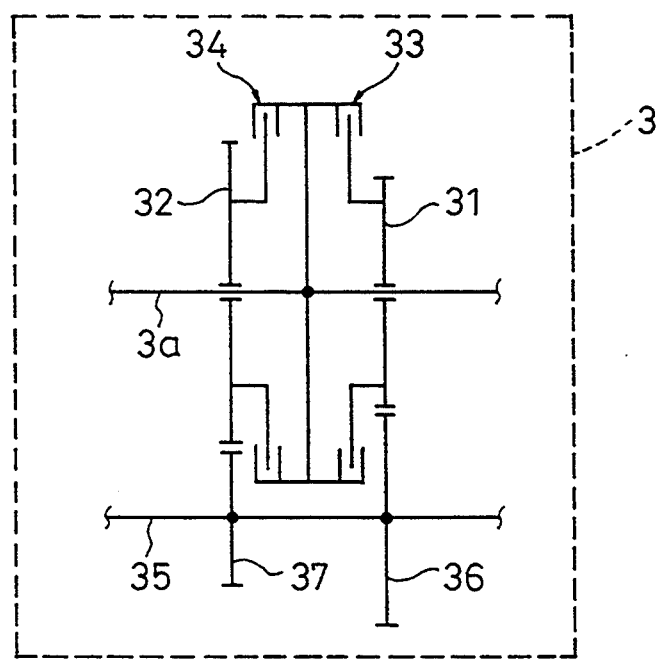
FIG. 2 is a schematic configuration diagram showing part of a gear train in the gear transmission shown in FIG. 1.

FIG. 2 shows a fragmentary view of the gear transmission 3 in which a first driving gear 31 and a second driving gear 32 are disposed for rotation around an input shaft 3a. Further, hydraulic clutches 33 and 34, serving as the speed change friction-engaging devices, are fixed on the input shaft 3a at locations located between the first driving gear 31 and the second driving gear 32. The driving gears 31 and 32 rotate in unison with the input shaft 3a when they are in engagement with the clutches 33 and 34. An intermediate transmission shaft 35 disposed in parallel to the input shaft 3a is connected to the driving axle via the final reduction gear (not shown). A first driven gear 36 and a second driven gear 37, which are fixed to the intermediate transmission shaft 35, are in mesh with the driving gears 31 and 32, respectively.

Hence, when the input shaft 3a is coupled to the first driving gear 31 through the clutch 33, the revolution of the input shaft 3a is transmitted to the clutch 33, the first driving gear 31, the first driven gear 36, and the intermediate transmission shaft 35, thereby establishing the first speed, for example. Likewise, when the input shaft 3a is coupled to the second driving gear 32 via the clutch 34, the revolution of the input shaft 3a is transmitted to the clutch 34, the second driving gear 32, the second driven gear 37, and the intermediate transmission shaft 35, thereby establishing the second speed, for example. In other words, the clutch 33 is used for the first-speed clutch, while the clutch 34 is used for the second-speed clutch. Therefore, hereinafter, the clutch 33 is referred to as the first-speed clutch and the clutch 34 as the second-speed clutch.

From the state wherein the first-speed clutch 33 is engaged, the automatic transmission 2 is upshifted from the first speed to the second speed by engaging the second-speed clutch 34 while disengaging the first-speed clutch 33. Inversely, from the state wherein the second-speed clutch 34 is engaged, the automatic transmission 2 is downshifted from the second speed to the first speed by engaging the first-speed clutch 33 while disengaging the second-speed clutch 34.

Figure 3:
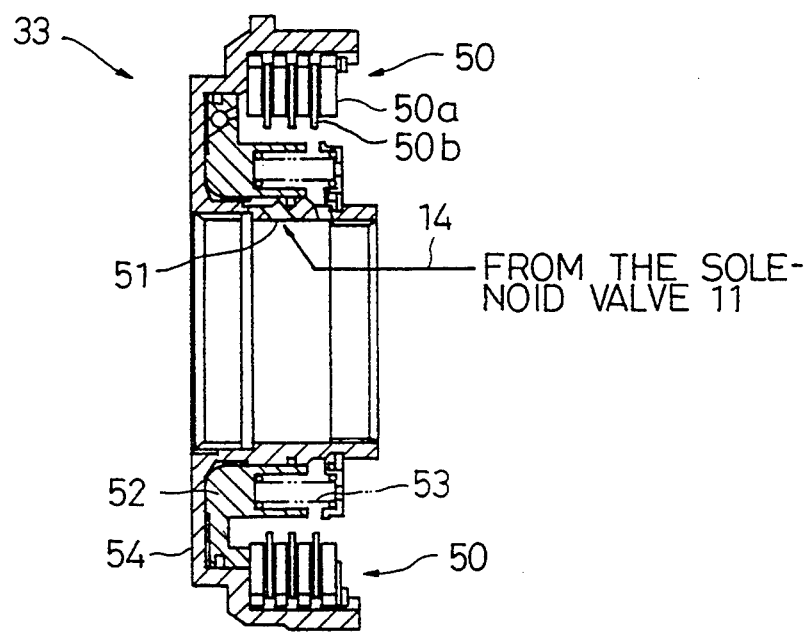
FIG. 3 is a cross-sectional view of the clutch shown in FIG. 2.

Both clutches 33 and 34 are hydraulic multi-disc clutches. FIG. 3 shows a cross section of the first-speed clutch 33 which primarily consists of a friction-engaging disc 50, a clutch piston 52, a return spring 53 which urges the clutch piston 52 in a direction away from the friction-engaging disc 50, and a clutch retainer 54 for housing these components.

The friction-engaging disc 50 consists of a plurality of clutch plates 50a provided on the clutch retainer 54 side, and a plurality of clutch discs 50b each provided between the clutch plates 50a concerned, the clutch discs 50b being connected to the driving gear 31. The clutch retainer 54 is connected to the input shaft 3a.

When oil pressure is supplied via a port 51 from an oil path 14 (mentioned later) into a cylinder formed between the clutch piston 52 and the clutch retainer 54, the clutch piston 52 moves to the right in the drawing, causing the clutch plates 50a and the clutch discs 50b to be friction-engaged. On the other hand, when the oil pressure supplied into the cylinder is drained through the oil path 14, the clutch piston 52 moves to the left in the drawing due to the action of the return spring 53, thereby releasing the engagement between the clutch plates 50a and the clutch discs 50b.

Usually in a multi-disc clutch with the aforementioned structure, a specified gap is provided between a clutch piston and friction-engaging discs, so as to prevent the clutch piston from contacting the friction-engaging disc, and prevent a resultant "drag torque" when the clutch is in a released state. For this reason, to control the engagement of the first-speed clutch 33, it is necessary to first move the clutch piston 52 by a distance equivalent to the gap (ineffective stroke), so that the clutch piston 52 and the clutch plates 50a stand by in positions where they are nearly in contact. This is known as the elimination of a dead-space. The dead-space eliminating operation requires a time Tf.

On the other hand, when releasing the first-speed clutch 33 which is in an engaged state, even if an attempt is made to separate the clutch piston 52 by discharging the supplied hydraulic oil, the clutch plates 50a do not separate from the clutch disc 50b immediately, a drag torque being generated between them for a while. Accordingly, to fully release the first-speed clutch 33, an oil pressure release time TO is required from the moment the discharge of the hydraulic oil is started to the moment the drag torque disappears.

The second-speed clutch 34, which has the same structure as the first-speed clutch 33, also requires a specified dead-space eliminating time at the time of engaging, and the oil pressure releasing time at the time of disengaging.

The hydraulic circuit 5, which has oil pressure control devices such as duty ratio controlled solenoid valves (hereinafter referred to as "solenoid valves") corresponding to the aforementioned speed change friction-engaging devices, causes the individual speed change friction-engaging devices, i.e., clutches and brakes, to operate independently from each other. Each solenoid valve operates a clutch or a brake in the same manner; therefore, an explanation on the first-speed solenoid valve which operates the first-speed clutch 33 is given with reference to FIG. 4, and the explanations on other solenoid valves will be omitted.

Figure 4:
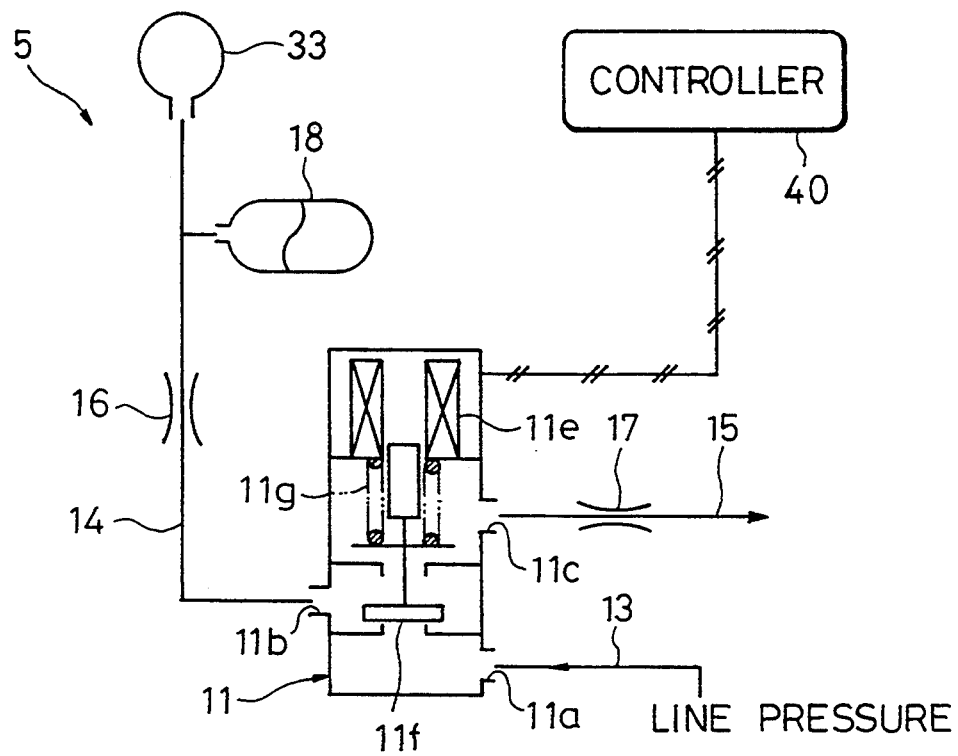
FIG. 4 is a schematic configuration diagram showing part of hydraulic circuit which operates the clutch shown in FIGS. 2 and 3.

FIG. 4 shows a part of the hydraulic circuit 5 provided with a first-speed solenoid valve 11 capable of supplying oil pressure to the first-speed hydraulic clutch 33. The solenoid valve 11 is a normally-closed type 2-position switching valve, and has three ports 11a through 11c.

Connected to the first port 11a is a first oil path 13 extending to an oil pump (not shown). A pressure-regulating valve or the like (not shown) is provided in the middle of the first oil path 13 to supply an oil pressure (line pressure) which is adjusted to a specified level.

Connected to the second port 11b is a second oil path 14 extending to the first-speed hydraulic clutch 33, and connected to a third port 11c is a third oil path 15 extending to the oil tank (not shown). The second and third oil paths 14 and 15 are provided with restrictions 16 and 17. The passage area of the restriction 16 provided in the second oil path 14 is set to be larger than that of the restriction 17 provided in the third oil path 15. Further, an accumulator 18 is connected to the second oil path 14 at a location located between the first-speed clutch 33 and the restriction 16.

The first-speed solenoid valve 11 electrically connected to the controller 40 is subject to duty ratio control performed by the controller 40 at a predetermined cycle, 50 Hz control cycle, for example. When the solenoid 11e of the solenoid valve 11 is in a de-energized state, the valve 11f is urged by a return spring 11g, to shut off the first port 11a and the second port 11b, and to cause the second port 11b to communicate with the third port 11c. When the solenoid 11e is in an energized state, the valve 11f lifts against the spring force of the return spring 11g, and causes the first port 11a to communicate with the second port 11b while shutting off the second port 11b and the third port 11c.

The controller 40 accommodates therein memories, such as a ROM and a RAM, a central processing unit, input/output devices, a counter used as a timer, etc (none of which is illustrated). As will be discussed in detail later, the controller functions to determine the duty ratios of the solenoid valves and the limit values on the duty ratios, and to drive the solenoid valves. Electrically connected to the input side of the controller 40 are various sensors including an Nt sensor 21, No sensor 22, θt sensor 23, and Ne sensor 24.

The Nt sensor 21 is a turbine rotational speed sensor for detecting the rotational speed Nt of the turbine (i.e., the input shaft of the gear transmission 3) of the torque converter 4. The No sensor 22 is a transfer drive gear rotational speed sensor for detecting the rotational speed No of the transfer drive gear (not shown). The controller 40 is capable of calculating a vehicle velocity V according to the rotational speed No.

The θt sensor 23 is a throttle valve opening sensor for detecting the valve opening θt of the throttle valve provided in the intake passage (not shown) of the engine 1. Further, the Ne sensor 24 is an engine speed sensor which is capable of detecting the speed Ne of the engine 1. These sensors 21 through 24 supply detected signals to the controller 40 at specified time intervals.

The controller 40 prestores, in its memory, the control procedure for the engagement-side friction-engaging devices and the control procedure for the disengagement-side friction-engaging devices for downshifting from high speed to low speed. The controller 40 repeatedly implements these procedures at specified intervals, so as to effect an operation for changeover of clutch connection between the engagement-side first-speed clutch 33 and the disengagement-side second-speed clutch 34, thereby changing the gear position of the automatic transmission 2.

The following describes the procedure which the controller 40 implements to make a gear position change of the automatic transmission 2, taking the downshifting from the second speed to the first speed as an example.

Speed change control on the engaging side

Figure 13:
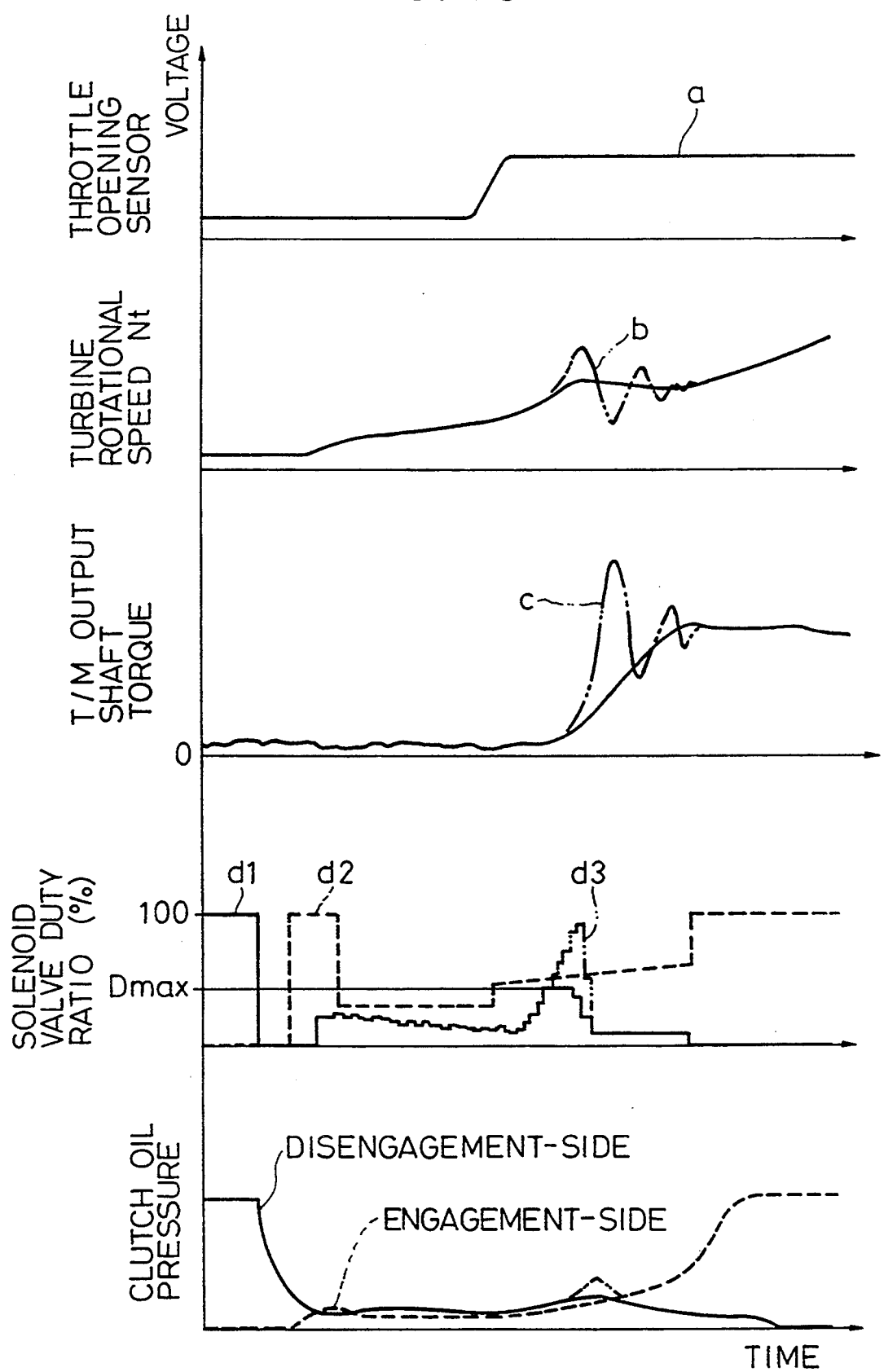
FIG. 13 is a view showing the changes primarily in the duty ratios of the engagement- and disengagement-side (the first- and the second-speed) solenoid valves and in the rotational speed of the turbine during a downshifting process.

First, the control procedure for the engagement-side friction-engaging devices will be explained according to FIG. 5 through FIG. 7 with reference to FIG. 13. The controller 40 controls the first-speed solenoid valve 11, which operates the first-speed clutch 33, by repeatedly implementing the first-speed solenoid valve control routine.

Figure 5:
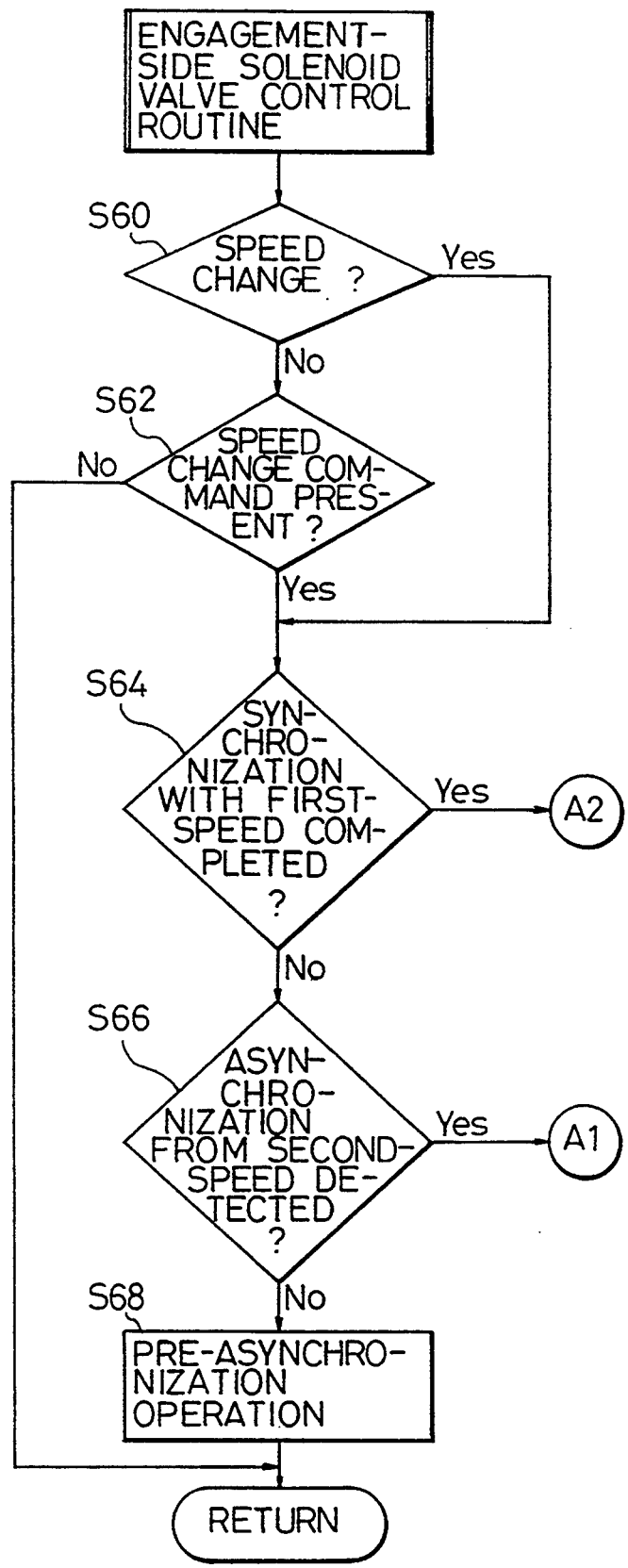
FIG. 5 is a flowchart showing part of an engaging clutch control routine implemented by the controller shown in FIGS. 1 and 4.

At first, the controller 40 proceeds to a step S60 shown in FIG. 5 and determines whether downshifting is being implemented. If downshifting is not being implemented, then the controller goes to a step S62 and determines whether a command for downshifting from the second speed to the first speed is delivered. If no command for downshifting is delivered, then the controller terminates the execution of the routine without carrying out any subsequent steps, and waits for a specified time to elapse before the controller runs the routine again from the beginning.

On the other hand, if the judgment result of the step S60 is affirmative or the judgment result of the step S62 is affirmative, then the controller 40 proceeds to a step S64. In the step S64, the controller determines whether the turbine rotational speed Nt has synchronized with the first speed synchronous rotation speed Ntj. More specifically, the controller 40 determines that the turbine rotational speed Nt has synchronized with the first speed synchronous rotational speed Ntj when a difference between the rotational speeds Nt and Ntj lowers down to a specified value $\Delta$ Nf (e.g., 50 rpm) or less.

If the judgment condition of the step S64 is not satisfied immediately after the downshifting is started, then the controller 40 proceeds to a step S66 where the controller determines whether the turbine rotational speed Nt has deviated from the second speed synchronous rotational speed Nti. More specifically, the controller 40 detects the deviation or asynchronous state when a difference between the rotational speeds Nt and Nti exceeds a specified value $\Delta$ Nb (e.g., 50 rpm).

If the controller 40 cannot detect the deviation or asynchronous state and the judgment result becomes negative, then the controller proceeds to a step S68 wherein the controller carries out pre-operation for the asynchronous state. As the pre-operation for the asynchronous state, the controller 40 continuously drives the first-speed solenoid valve 11 at a duty ratio of 100%, as shown in FIG. 13 by a dotted line curve d2 indicative of the changes in the duty ratio of the solenoid valve with the elapse of time, to thereby eliminate the deadspace of the first-speed clutch 33.

Figure 6:
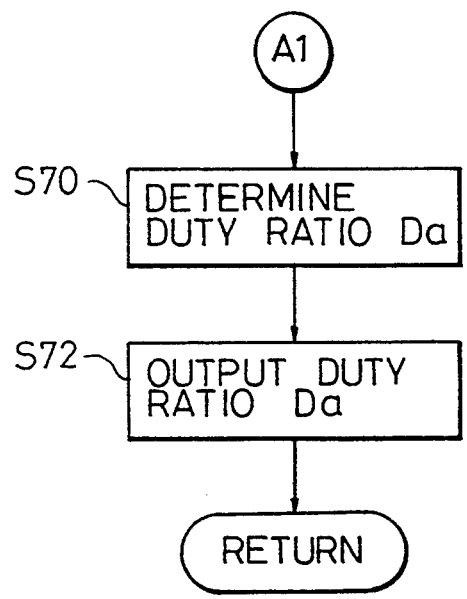
FIG. 6 is a flowchart showing another part of the engaging clutch control routine, which continues from FIG. 5.

On the other hand, if the controller 40 detects in the step S66 that the turbine rotational speed Nt has deviated from the second-speed synchronous rotational speed Nti and the judgment result becomes affirmative, then the controller proceeds to a step S70 of FIG. 6. In the step S70, the controller calculates the oil pressure required for the first-speed clutch 33 according to a relationship between a change rate (Nt)' of the turbine rotational speed Nt and an engagement-side target change rate (Nia)', and sets a duty ratio Da at a value which allows the oil pressure to be obtained.

The controller 40 then proceeds to a step S72 wherein the controller drives the first-speed solenoid valve 11 at the duty ratio Da thus set. The controller 40 executes the steps S70 and S72 by repeating the routine, and performs feedback control on the first-speed solenoid valve 11. Thus, the duty ratio Da of the first-speed solenoid valve 11 is gradually increased, as shown in FIG. 13 by a dotted line curve d2 indicative of the duty ratio of the solenoid valve, to thereby control the working oil pressure of the first-speed clutch 33, so that the clutch 33 is gradually engaged.

The engagement-side target change rate (Nia)' has a value determined in advance according to a mode of downshifting, and is stored beforehand in the memory of the controller 40. The symbol (Nt)' denotes the time differential value of Nt. The same applies to other time differential values.

Figure 7:
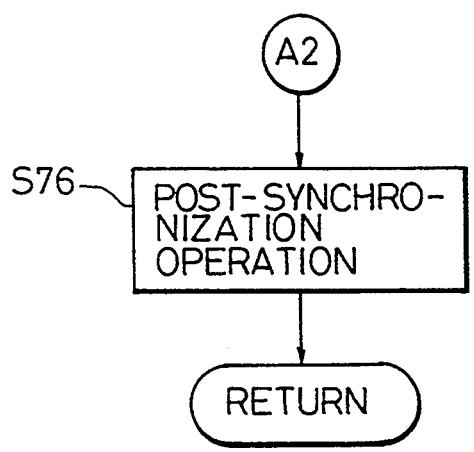
FIG. 7 is a flowchart showing still another part of the engaging clutch control routine, which continues from FIG. 5.

If the turbine rotational speed Nt increases to be synchronized with the first-speed synchronous rotational speed Ntj, and hence the judgment result of the step S64 becomes affirmative, the controller 40 goes to a step S76 of FIG. 7 wherein the controller performs a post-synchronization operation. As the post-synchronization operation, the controller 40 sets the duty ratio Da of the first-speed solenoid valve 11 at 100%, as shown in FIG. 13 by the dotted line curve d2 indicative of the duty ratio of the solenoid valve, so as to supply a maximum oil pressure to the first-speed clutch 33. This thereby causes the clutch 33 to be fully engaged.

Speed change control on the disengaging side

Next, the control procedure for the disengagement-side friction-engaging devices will be explained according to FIG. 8 through FIG. 11 with reference to FIG. 13. The controller 40 controls the second-speed solenoid valve (not shown), which operates the second-speed clutch 34, by repeatedly implementing the second-speed solenoid valve control routine.

At first, the controller 40 proceeds to a step S80 and determines whether downshifting is being implemented. If downshifting is not being implemented, then the controller goes to a step S82 and determines whether a command for downshifting from the second speed to the first speed is delivered. If the command for downshifting is not delivered, then the controller terminates the execution of the routine without carrying out any subsequent steps, and waits for a specified time to elapse before the controller runs the routine again from the beginning.

On the other hand, if the judgment result of the step S80 is affirmative or the judgment result of the step S82 is affirmative, then the controller 40 proceeds to a step S84 wherein the controller determines, just like in the step S64 shown in FIG. 5, whether the turbine rotational speed Nt has synchronized with the first-speed synchronous rotation speed Ntj.

If the judgment condition of the step S84 is not satisfied immediately after the downshifting is started, then the controller 40 proceeds to a step S86 wherein the controller determines, just like in the step S66 shown in FIG. 5, whether the turbine rotational speed Nt has deviated from the second-speed synchronous rotational speed Nti.

If the controller 40 cannot detect the deviation or asynchronous state and the judgment result becomes negative, then the controller 40 proceeds to a step S88 wherein the controller carries out pre-operation for the asynchronization. As the pre-asynchronization operation, the controller 40 drives the second-speed solenoid valve (not shown) at a duty ratio 0%, as shown in FIG. 13 by a solid line curve d1 indicative of the duty ratio of the solenoid valve, for a specified time.

Figure 9:
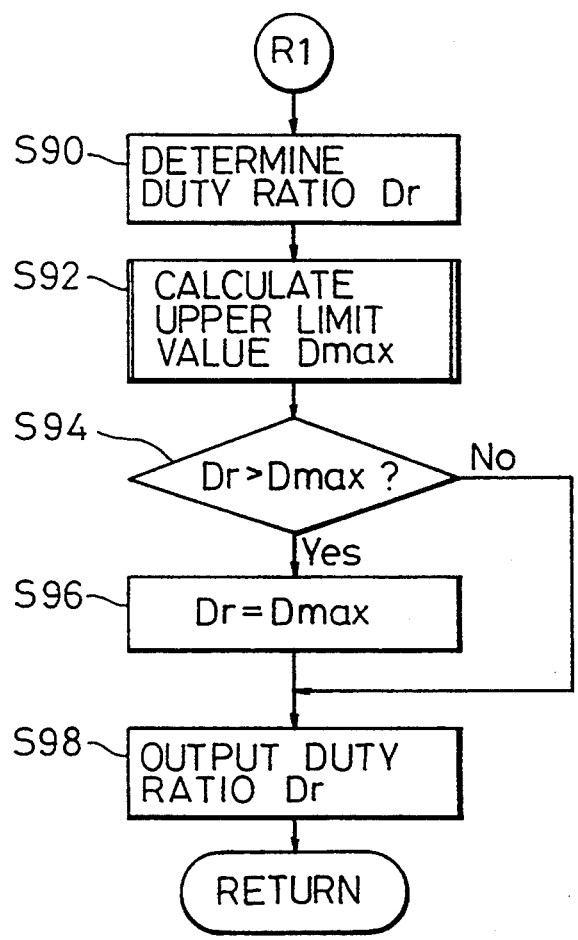
FIG. 9 is a flowchart showing another part of the disengaging clutch control routine and which continues from FIG. 8.

On the other hand, if the controller 40 detects the deviation of the turbine rotational speed Nt from the second-speed synchronous rotational speed Nti in the step S86 and the judgment result becomes affirmative, then the controller 40 proceeds to a step S90 of FIG. 9. In the step S90, the controller calculates the oil pressure required for the second-speed clutch 34 according to a relationship between the change rate (Nt)' of the turbine rotational speed and a disengagement-side target change rate (Nir)', and sets a duty ratio Dr at a value which allows the oil pressure to be obtained. The disengagement-side target change rate (Nir)', which has a value determined in advance according to a downshifting mode, is stored in the memory of the controller 40.

After that, the controller 40 goes to a step S92. In the step S92, the controller 40 executes a subroutine shown in FIG. 10 to determine an upper limit value Dmax. More specifically, the controller 40 reads a throttle valve opening $\theta t(\%)$ from the $\theta t$ sensor 23 (step S100), and calculates the upper limit value Dmax by multiplying the valve opening $\theta t$ by a specified value K1 (step S102). Thus, the upper limit value Dmax is set for a value according to the load of the engine 1.

After determining the upper limit value Dmax, the controller 40 goes to a step S94 of FIG. 9 and judges whether the duty ratio Dr of the second-speed solenoid valve (not shown) lies in the range of 0% to the upper limit value Dmax. The second-speed solenoid valve of this embodiment is designed so that it stops the supply of the oil pressure when the duty ratio is 0%, while it supplies the maximum working oil pressure when the duty ratio is 100%. Hence, the controller can determine whether the duty ratio Dr is in the range from 0% to the upper limit value Dmax by checking only the upper limit.

In the step S94, the controller 40 determines whether the duty ratio Dr is larger than the upper limit value Dmax. If the judgment result is negative and it is unnecessary to correct the upper limit of the duty ratio Dr, then the controller 40 advances to a step S98 without executing a step S96.

On the other hand, if the judgment result of the step S94 is affirmative and it is necessary to correct the upper limit of the duty ratio Dr, then the controller 40 executes the step S96 to set the duty ratio Dr at the upper limit value Dmax. This prevents the duty ratio Dr from exceeding the upper limit value Dmax while the duty ratio Dr is being feedback-controlled.

The controller 40 then advances to the step S98 wherein the controller drives the second-speed solenoid valve (not shown) at the determined duty ratio Dr. The controller 40 runs the steps S90 through S98 by repeating the routine, thereby performing the feedback control of the second-speed solenoid valve.

The duty ratio Dr of the second-speed solenoid valve has been set for a value of the upper limit value Dmax or less. This prevents the duty factor Dr of the second-speed solenoid valve from being set at an excessive value due to the delayed rise of the oil pressure of the clutch 34 when it becomes necessary to increase the engagement of the second-speed clutch 34 so as to cope with a sudden increase in the depression of the accelerator pedal during a downshifting process, as shown in FIG. 13. Hence, unlike the conventional speed change control method (2-dotted chain line shown in FIG. 13), it is possible to prevent the occurrence of the interlock problem and suppress fluctuations in the turbine rotational speed Nt, whereby smooth increase in the torque of the output shaft is ensured.

When using a solenoid valve which is designed to stop the supply of oil pressure when the duty ratio is 100% and to supply the maximum oil pressure when the duty ratio is 0%, then the correction of a lower limit may be performed in place of the correction of an upper limit described above, so that the duty ratio Dr may be set at a value within a range from the lower limit value to 100%.

Figure 11:
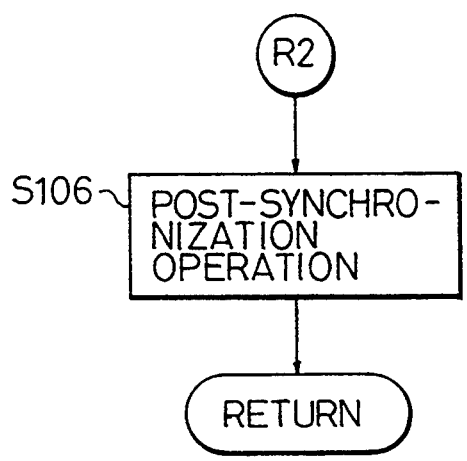
FIG. 11 is a flowchart showing still another part of the disengaging clutch control routine, which continues from FIG. 8.

When the turbine rotational speed Nt increases and the judgment result of the step S84 of FIG. 8 becomes affirmative, the controller 40 proceeds to a step S106 of FIG. 11 to carry out the post-synchronization operation. As the post-synchronization operation, the controller 40 sets the duty ratio Dr of the second-speed solenoid valve to 0%, as shown by the solid line in FIG. 13, to stop the supply of the oil pressure to the second-speed clutch 34, thereby fully releasing the engagement of the clutch 34. At the same time, the first-speed clutch 33 will be fully engaged to establish the first speed, as described above, completing the downshifting process.

Figure 10:
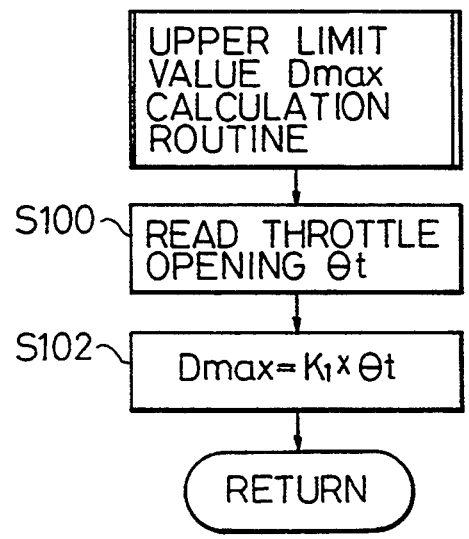
FIG. 10 is a flowchart of a routine for calculating an upper limit value Dmax, which routine is implemented in a step S92 shown in FIG. 9.

In this embodiment, the subroutine shown in FIG. 10 is executed to determine the upper limit value Dmax of the duty ratio Dr in relation to the throttle valve opening $\theta t$. As an alternative method, the subroutine shown in FIG. 12 may be executed, to determined the upper limit value Dmax of the duty ratio Dr in relation to the rotational torque of the turbine.

Figure 12:
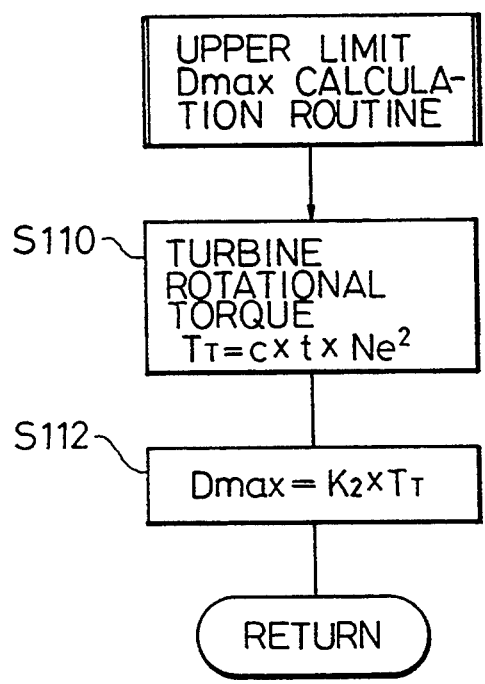
FIG. 12 is a flowchart of a routine for calculating the upper limit value Dmax, which is different from that shown in FIG. 10.

More specifically, in the step S110 of FIG. 12, the controller 40 determines the turbine rotational torque Tt. The turbine rotational torque Tt can be determined by the following formula:

$$Tt = c \times t \times Ne^2$$

where "c" is a torque capacity coefficient which is read out from a torque converter characteristic table, which is stored in the memory beforehand, according to a speed ratio "e" (=Nt/Ne) of the turbine speed Nt to the engine speed Ne. Hence, the speed ratio "e" is first calculated from the turbine speed Nt detected by the Nt sensor 21 and the engine speed Ne detected by the Ne sensor 24. Then, the torque capacity coefficient "c" is read out from the memory according to the calculated speed ratio "e."

Likewise, "t" is a torque ratio which is read out from the torque converter characteristic table, which is stored in the memory beforehand, according to the speed ratio "e" (=Nt/Ne) of the turbine speed Nt to the engine speed Ne.

Then, the controller 40 proceeds to a step S112 wherein the controller calculates the upper limit value Dmax by multiplying the turbine rotational torque Tt by a specified value K2. This allows the upper limit value Dmax to be set at a value which is suitable to the turbine rotational torque.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speed change control apparatus for an automatic transmission in a vehicle, the transmission having a first friction-engaging device for establishing a first gear position, a second friction-engaging device for establishing a second gear position, a first oil pressure control device for controlling an oil pressure applied to the first friction-engaging device, and a second oil pressure control device for controlling an oil pressure applied to the second friction-engaging device, the speed change control apparatus performing duty control of at least the first oil pressure control device, so as to effect a shift from the first gear position to the second gear position by disengaging the first friction-engaging device which has been in an engaged state and by engaging the second friction-engaging device which has been in a disengaged state, the speed change control apparatus comprising:

duty ratio determining means for determining a duty ratio for the duty control of at least the first oil pressure control device;

limit value determining means for setting a limit value for the determined duty ratio in such a manner that the oil pressure supplied to the first oil pressure control device is prevented from exceeding a predetermined value; and driving means for driving at least the first oil pressure control means according to a limited duty ratio, determined from the determined duty ratio and the set limit value.

2. The speed change control apparatus of claim 1, wherein the automatic transmission has an input shaft provided with a hydraulic coupling, and the speed change control apparatus further includes feedback control means for feedback-controlling at least the first oil pressure control means using, as a target value, a turbine rotational speed change rate of said hydraulic coupling, said duty ratio determining means determining the duty ratio in accordance with a difference between the target value and an actual value.

3. The speed change control apparatus of claim 1, wherein said limit value determining means sets the limit value according to a load of an engine of the vehicle.

4. The speed change control apparatus of claim 1, wherein the automatic transmission has an input shaft, and said limit value determining means determines the limit value in accordance with a torque of the input shaft of the automatic transmission.

5. The speed change control apparatus of claim 4, wherein the input shaft torque is determined in accordance with a speed ratio of a hydraulic coupling coupled to the input shaft of the automatic transmission.

6. A speed change control method for an automatic transmission in a vehicle, in which, among a first oil pressure control device for controlling oil pressure applied to a first friction-engaging device for establishing a first gear position and a second oil pressure control device for controlling oil pressure applied to a second friction-engaging device for establishing a second gear position, at least the first oil pressure control device is subjected to duty control, so that the first friction-engaging device which has been in an engaged state is disengaged and the second friction-engaged device which has been in a disengaged state is engaged, to thereby effect a shift from the first gear position to the second gear position, the speed change control method comprising the steps of:

(a) determining a duty ratio for the duty control of at least the first oil pressure control device;

(b) setting a limit value for the determined duty ratio;

(c) determining a limited duty ratio in accordance with the determined duty ratio of step (a) and the set limit value of step (b); and (d) driving at least the first oil pressure control device according to the determined limited duty ratio of step (c).

7. The speed change control method of claim 6, further including: (e) feedback-controlling at least the first oil pressure control device by using, as a target value, a turbine rotational speed change rate of a hydraulic coupling coupled to an input shaft of the automatic transmission, wherein said duty ratio is determined in accordance with a difference between the target value and an actual value.

8. The speed change control method of claim 6, wherein the limit value is set in step (b) in accordance with a load of an engine of the vehicle.

9. The speed change control method of claim 6, wherein the limit value is set in step (b) in accordance with a torque of an input shaft of the automatic transmission.

10. The speed change control method of claim 9, wherein the input shaft torque is determined in accordance with a speed ratio of a hydraulic coupling coupled to the input shaft of the automatic transmission.

* * * * *